United States Patent
Cassidy et al.

(10) Patent No.: US 10,831,595 B1
(45) Date of Patent: Nov. 10, 2020

(54) PERFORMING ERROR DETECTION DURING DETERMINISTIC PROGRAM EXECUTION

(71) Applicant: International Business Machines Corporation, Armonk, NY (US)

(72) Inventors: Andrew S. Cassidy, San Jose, CA (US); Dharmendra S. Modha, San Jose, CA (US); John V. Arthur, Mountain View, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/428,558

(22) Filed: May 31, 2019

(51) Int. Cl.
| | |
|---|---|
| G06F 11/10 | (2006.01) |
| G06F 11/08 | (2006.01) |
| G06F 11/07 | (2006.01) |
| G06F 11/16 | (2006.01) |
| G06F 11/14 | (2006.01) |

(52) U.S. Cl.
CPC ...... G06F 11/1048 (2013.01); G06F 11/0796 (2013.01); G06F 11/085 (2013.01); G06F 11/14 (2013.01); G06F 11/1608 (2013.01)

(58) Field of Classification Search
CPC .... G06F 11/08; G06F 11/085; G06F 11/0796; G06F 11/1048; G06F 11/14; G06F 11/1608
See application file for complete search history.

(56) References Cited

U.S. PATENT DOCUMENTS

| | | | |
|---|---|---|---|
| 4,920,538 A | 4/1990 | Chan et al. | |
| 8,196,026 B2 | 6/2012 | Nagaraj | |
| 9,336,114 B2 | 5/2016 | Shin et al. | |
| 9,836,354 B1 | 12/2017 | Potlapally et al. | |
| 10,020,822 B2 | 7/2018 | Zhang et al. | |
| 2013/0262938 A1* | 10/2013 | Schmitt | H03M 13/47 714/48 |

(Continued)

FOREIGN PATENT DOCUMENTS

| | | |
|---|---|---|
| JP | 2011248845 A | 12/2011 |
| JP | 4999262 B2 | 8/2012 |

OTHER PUBLICATIONS

Koopman et al., "Tutorial: Checksum and CRC Data Integrity Techniques for Aviation," Presentation in Electrical & Computer Engineering, May 9, 2012, pp. 1-44, retrieved from https://users.ece.cmu.edu/~koopman/pubs/koopmanCRCWebinar9May2012.pdf.

(Continued)

*Primary Examiner* — Shelly A Chase
(74) *Attorney, Agent, or Firm* — Zilka-Kotab, P.C.

(57) ABSTRACT

A computer-implemented method according to one embodiment includes, prior to an execution of a deterministic program, determining a pre-computed check sequence for a first plurality of values associated with the execution of the deterministic program, during the execution of the deterministic program, determining a runtime check sequence for a second plurality of values associated with the execution of the deterministic program, comparing the pre-computed check sequence to the runtime check sequence; and identifying one or more errors associated with the execution of the deterministic program, based on the comparing.

20 Claims, 7 Drawing Sheets

(56) References Cited

U.S. PATENT DOCUMENTS

2018/0121272 A1* 5/2018 Kordik .................. G06F 11/302
2019/0073472 A1* 3/2019 Darmon ................ G06F 21/577

OTHER PUBLICATIONS

Wikipedia, "Cyclic redundancy check," Wikipedia, last updated May 23, 2019, pp. 9, retrieved from https://en.wikipedia.org/wiki/Cyclic_redundancy_check.
Hennessy et al., "Computer Architecture: A Quantitative Approach," Morgan Kaufmann, 4th edition, 2007, pp. 705, retrieved from http://citeseerx.ist.psu.edu/viewdoc/download?doi=10.1.1.115.1881&rep=rep1&type=pdf.
Patterson et al., "Computer Organization and Design: The Hardware/Software Interface," Morgan Kaufmann, 5th edition, 2014, pp. 793, retrieved from http://ac.aua.am/arm/public/2017-Spring-Computer-Organization/Textbooks/ComputerOrganizationAndDesign5thEdition2014.pdf.
Maxino et al., "The Effectiveness of Checksums for Embedded Control Networks," IEEE Transactions on Dependable and Secure Computing, vol. 6, No. 1, Jan.-Mar. 2009, pp. 59-72.
U.S. Appl. No. 16/012,475, filed Jun. 19, 2018.
U.S. Appl. No. 16/033,926, filed Jun. 12, 2018.
U.S. Appl. No. 15/942,289, filed Mar. 30, 2018.

* cited by examiner

United States Patent 10,831,595 B1

PERFORMING ERROR DETECTION DURING DETERMINISTIC PROGRAM EXECUTION

This invention was made with government support under FA8750-18-C-0015 awarded by the U.S. Air Force, Office of Scientific Research. The government has certain rights to this invention.

BACKGROUND

The present invention relates to error detection, and more specifically, this invention relates to performing error detection during the execution of a deterministic program by a hardware device.

Intelligence (e.g., software implemented by hardware, etc.) is being embedded into more and more devices. Many of these devices are incorporated into safety and mission-critical systems. However, errors or faults associated with this intelligence may occur. For example, manufacturing defects (e.g., wire shorts, opens, etc.), operational defects (e.g., electromigration, etc.), transient faults (e.g., noise, radiation particles, etc.), and operational errors (e.g., software bugs, malicious/tampered code, etc.) may produce errors during the execution of one or more programs by hardware. It is therefore desirable to identify faults and errors associated with this intelligence so that they may be corrected, or so that mitigating actions may be taken (e.g., to prevent system failures, etc.).

SUMMARY

A computer-implemented method according to one embodiment includes, prior to an execution of a deterministic program, determining a pre-computed check sequence for a first plurality of values associated with the execution of the deterministic program, during the execution of the deterministic program, determining a runtime check sequence for a second plurality of values associated with the execution of the deterministic program, comparing the pre-computed check sequence to the runtime check sequence; and identifying one or more errors associated with the execution of the deterministic program, based on the comparing.

According to another embodiment, a processor includes compare circuitry for performing error detection during deterministic program execution, where the compare circuitry performs a method comprising, prior to an execution of a deterministic program, determining, by the compare circuitry, a pre-computed check sequence for a first plurality of values associated with the execution of the deterministic program, during the execution of the deterministic program, determining, by the compare circuitry, a runtime check sequence for a second plurality of values associated with the execution of the deterministic program, comparing, by the compare circuitry, the pre-computed check sequence to the runtime check sequence, and identifying, by the compare circuitry, one or more errors associated with the execution of the deterministic program, based on the comparing.

According to another embodiment, a system includes a processor including compare circuitry for, prior to an execution of a deterministic program, determining a pre-computed check sequence for a first plurality of values associated with the execution of the deterministic program, during the execution of the deterministic program, determining a runtime check sequence for a second plurality of values associated with the execution of the deterministic program, comparing the pre-computed check sequence to the runtime check sequence; and identifying one or more errors associated with the execution of the deterministic program, based on the comparing.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for performing error detection during deterministic program execution. Various embodiments provide a method for comparing a pre-determined check sequence to a runtime check sequence during an execution of a deterministic program in order to identify one or more errors associated with the execution.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing error detection during deterministic program execution.

In one general embodiment, a computer-implemented method includes, prior to an execution of a deterministic program, determining a pre-computed check sequence for a first plurality of values associated with the execution of the deterministic program, during the execution of the deterministic program, determining a runtime check sequence for a second plurality of values associated with the execution of the deterministic program, comparing the pre-computed check sequence to the runtime check sequence; and identifying one or more errors associated with the execution of the deterministic program, based on the comparing.

In another general embodiment, a processor includes compare circuitry for performing error detection during deterministic program execution, where the compare circuitry performs a method comprising, prior to an execution of a deterministic program, determining, by the compare circuitry, a pre-computed check sequence for a first plurality of values associated with the execution of the deterministic program, during the execution of the deterministic program, determining, by the compare circuitry, a runtime check sequence for a second plurality of values associated with the execution of the deterministic program, comparing, by the compare circuitry, the pre-computed check sequence to the runtime check sequence, and identifying, by the compare circuitry, one or more errors associated with the execution of the deterministic program, based on the comparing.

In another general embodiment, a system includes a processor including compare circuitry for, prior to an execution of a deterministic program, determining a pre-computed check sequence for a first plurality of values associated with the execution of the deterministic program, during the execution of the deterministic program, determining a runtime check sequence for a second plurality of values associated with the execution of the deterministic program, comparing the pre-computed check sequence to the runtime check sequence; and identifying one or more errors associated with the execution of the deterministic program, based on the comparing.

Figure 1:
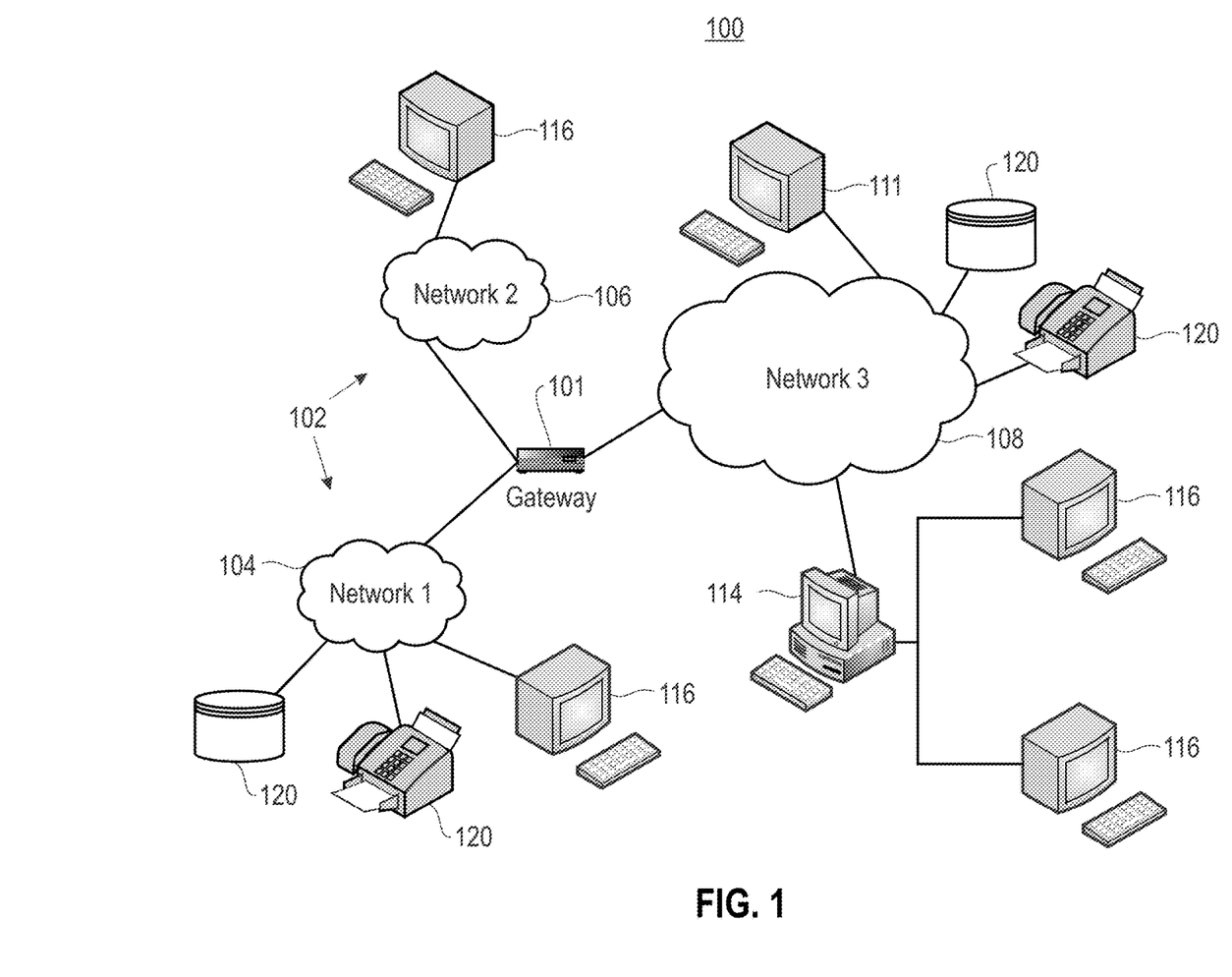
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
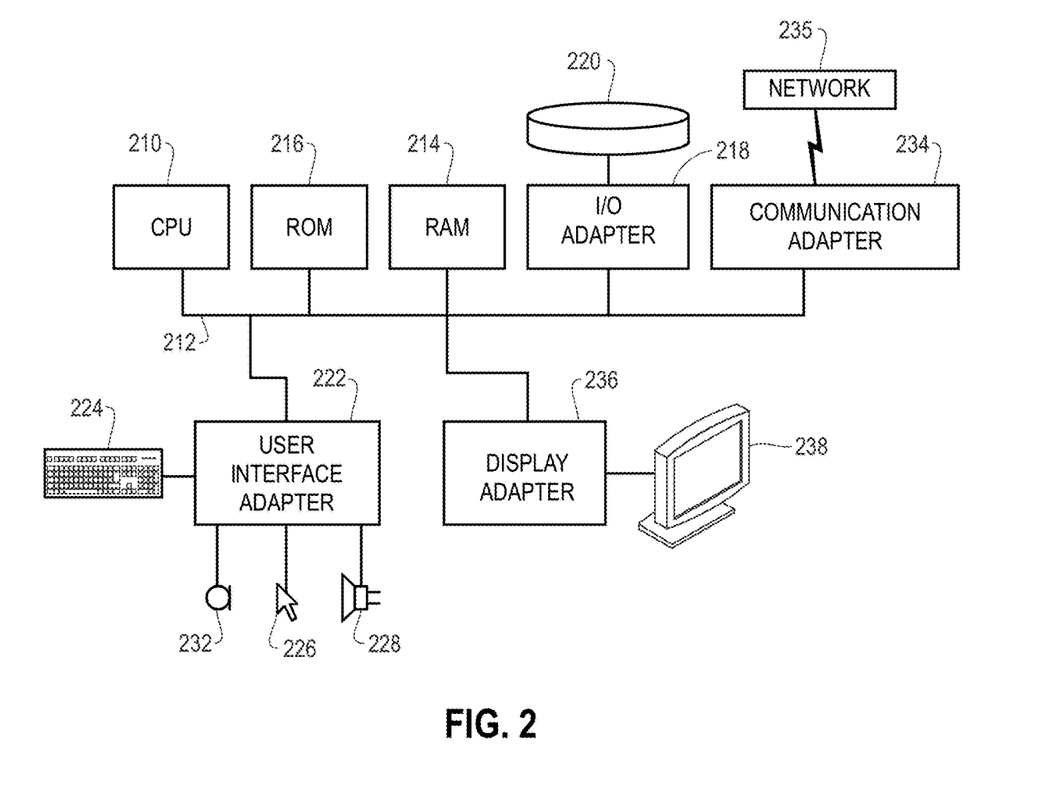
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
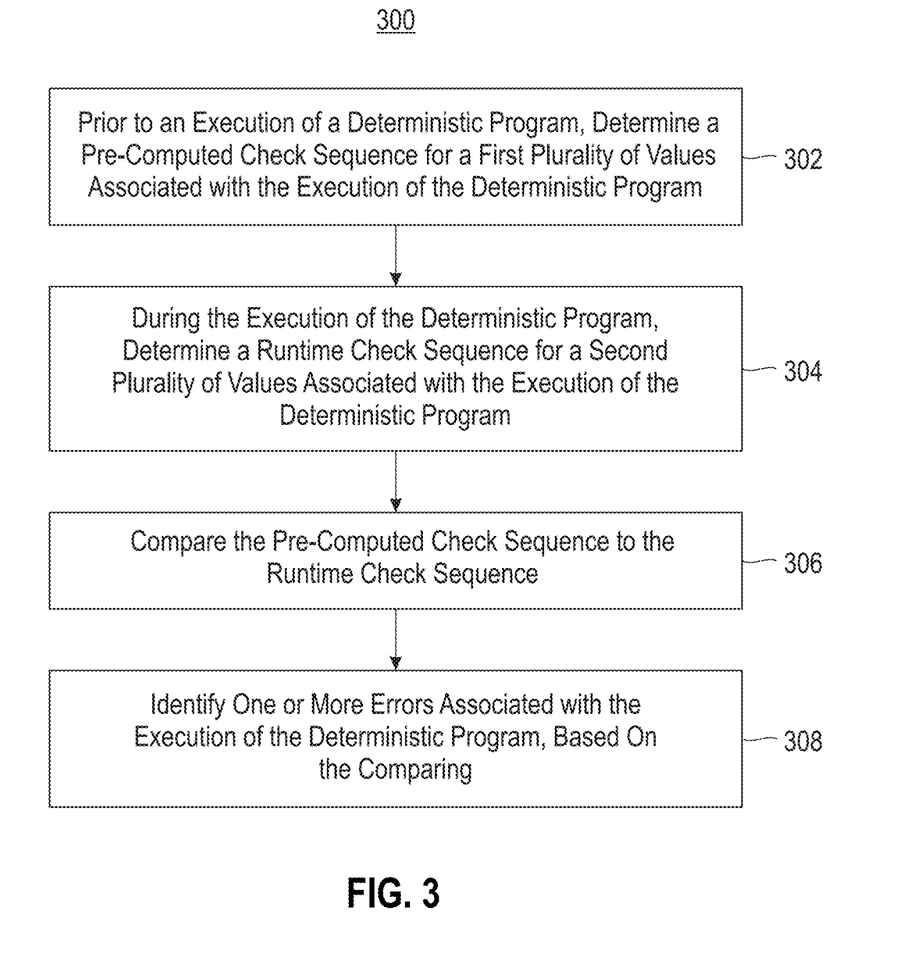
FIG. 3 illustrates a method for performing error detection during deterministic program execution, in accordance with one embodiment.

Now referring to FIG. 3, a flowchart of a method 300 is shown according to one embodiment. The method 300 may be performed in accordance with the present invention in any of the environments depicted in FIGS. 1, 2, and 5-7, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), a neural inference processing unit (NPU), an application specific integrated circuit (ASIC), a field programmable gate array (FPGA), etc., combinations thereof, or any other suitable computing device known in the art.

As shown in FIG. 3, method 300 may initiate with operation 302, where prior to an execution of a deterministic program, a pre-computed check sequence is determined for a first plurality of values associated with the execution of the deterministic program. In one embodiment, the first plurality of values may be associated with a predetermined portion of the deterministic program. For example, predetermined portion may include a fixed-length, deterministic program execution sequence within the deterministic program. In another example, the predetermined portion may include a plurality of instructions to be executed by a processor.

Additionally, in one embodiment, the first plurality of values may include a predetermined desired output of an execution of the predetermined portion of the deterministic program by a processor. For example, the first plurality of values may include a plurality of program counter (PC) values desired to be generated by the processor for the predetermined portion of the deterministic program. For example, the PC may include a pointer to memory that indicates a current instruction to read out within a program. When the instruction is read out to program control, the program counter is updated to the next instruction in the program.

In another example, the first plurality of values may include a plurality of instructions desired to be generated by the processor during the execution of the plurality of instructions within the predetermined portion of the deterministic program. For instance, the instructions may include a plurality of operation codes (OP codes), a plurality of operands, etc. In another embodiment, the first plurality of values may include a plurality of neural network parameters (e.g., one or more weights, biases, thresholds, activation functions, etc.).

Further, in one embodiment, the predetermined portion of the deterministic program may have a predetermined sequence length indicative of a predetermined number of data words, a predetermined interval, etc. In another embodiment, the first plurality of values may be deterministic. In yet another embodiment, the first plurality of values may include a predetermined test vector (e.g., a predetermined test data sequence) computed by the processor, from one or more data sequences input into the processor, during the execution of the predetermined portion of the deterministic program. In still another embodiment, the first plurality of values may comprise neuron activations and may be generated by at least a portion of a neural network execution (e.g., a full neural network or a fraction of a neural network, etc.).

Further still, in one embodiment, determining the pre-computed check sequence may include applying an error correcting code (ECC) to the first plurality of values. For example, the ECC may include one or more of a parity computation, a longitudinal redundancy check (LRC) computation, a checksum computation, a cyclic redundancy code (CRC) computation, a cryptographic hash computation, etc.

Also, in one embodiment, the pre-computed check sequence may include the result of applying the ECC. For example, the pre-computed check sequence may include one or more of a checksum, an LRC, a CRC, a cryptographic hash, etc. In another embodiment, the pre-computed check sequence may be stored after being determined. For example, the pre-computed check sequence may be loaded into a hardware register of the processor.

In addition, in one embodiment, the deterministic program may include a program that follows the same predetermined sequence of instructions, regardless of the data being computed on (e.g., processed) by the program. In this way, the deterministic program may be dependent on the instructions found within the deterministic program, and not the data being processed. In another embodiment, the pre-computed check sequence may be determined utilizing hardware circuitry added to a hardware processor. In yet another embodiment, the deterministic program may include a neural network.

Furthermore, method 300 may proceed with operation 304, where during the execution of the deterministic program, a runtime check sequence is determined for a second plurality of values associated with the execution of the deterministic program. In one embodiment, the deterministic program may be executed by a hardware processor. For example, the processor may include a microprocessor, a microengine, a neural network processing unit, a neural inference processing unit, etc. In another embodiment, the processor may include a processor for performing neural inference (e.g., a neural network processor, etc.). In yet another embodiment, the processor may include a digital signal processor (DSP). In still another embodiment, the processor may include a field-programmable gate array (FPGA).

Further still, in one embodiment, the second plurality of values may be associated with the same predetermined portion of the deterministic program associated with the first plurality of values. For example, the second plurality of values may be generated by the processor during the execution of the predetermined portion of the deterministic program for which the first plurality of values were provided.

Also, in one embodiment, the second plurality of values may include runtime values (e.g., program counter values, instructions, etc.) output by the processor during the processing of the predetermined portion of the deterministic program. For example, the processor may receive instructions included within the predetermined portion of the deterministic program, and may generate the runtime values during the execution of such instructions.

Additionally, in one embodiment, the second plurality of values may include a test data sequence computed by the processor, from one or more data sequences (e.g., test vectors) input into the processor, during the execution of the predetermined portion of the deterministic program for which the first plurality of values were provided. In another embodiment, the second plurality of values may be obtained utilizing one or more observation points within a processor environment. In yet another embodiment, the second plurality of values may be obtained from a control plane of a processor.

Further, in one embodiment, the second plurality of values may be obtained from a data plane of a processor. In another embodiment, determining the runtime check sequence may include applying an error correcting code (ECC) to the second plurality of values. For example, the ECC applied may be the same ECC applied during the determining of the pre-computed check sequence.

Further still, in one embodiment, the runtime check sequence may include the result of applying the ECC. For example, the pre-computed check sequence may include one or more of a checksum, an LRC, a CRC, a cryptographic hash, etc. In another embodiment, the runtime check sequence may be determined utilizing hardware circuitry added to the hardware processor. In yet another embodiment, the runtime check sequence may be stored in a hardware register of the processor. For example, the runtime check sequence may be stored in a hardware register separate from the hardware register storing the pre-computed check sequence.

Also, method 300 may proceed with operation 306, where the pre-computed check sequence is compared to the runtime check sequence. In one embodiment, the comparing may be performed in response to a sequence counter matching a predetermined sequence length. For example, a sequence counter of a hardware processor may be initialized at a start of an execution of the deterministic program by the processor. In another example, the sequence counter may be incremented after every instruction cycle (e.g., after each instruction within the predetermined portion of the deterministic program is read and executed by the processor).

In addition, in one example, the comparing may be performed in response to determining that the sequence counter matches the predetermined sequence length. In another example, the predetermined sequence length may have the same length as the predetermined portion of the deterministic program.

Furthermore, in one embodiment, the comparing may include retrieving the pre-computed check sequence and the runtime check sequence from storage (e.g., a hardware register of the processor). In another embodiment, the comparing may be performed utilizing hardware circuitry added to the hardware processor.

Further still, method 300 may proceed with operation 308, where one or more errors associated with the execution of the deterministic program are identified, based on the comparing. In one embodiment, one or more errors may be identified in response to determining that the pre-computed check sequence does not match the runtime check sequence. In another embodiment, no errors may be identified in response to determining that the pre-computed check sequence matches the runtime check sequence.

Also, in one embodiment, the program may be restarted or updated in response to the one or more errors. In another embodiment, one or more security measures may be implemented in response to the one or more errors. In yet another embodiment, the hardware processor may be replaced in response to the one or more errors. In still another embodiment, the above operations may be performed by hardware compare circuitry implemented in association with a processor.

In this way, PC values and instructions (e.g., OP codes, operands, etc.) may be monitored during the execution of a deterministic application by a processor. This may allow for the implementation of ECC checking of such values and instructions. Additionally, test data sequences within a data plane of the processor may be monitored, and ECC checking may be implemented for the test data sequences as well. As a result, error detection may be implemented within a control plane and/or a data plane of a processor during runtime, which may improve the security, stability, and performance of a computing system implementing the processor.

Further, no branch/path detection circuitry may be required for the comparison to be performed. Further still, only one check value may be needed for each operational sequence for which error detection is performed, which may reduce an amount of memory needed to perform error detection. Also, control signals may be checked over multiple observation points, including one or more of a program counter, an OP, an OP code, an operand index, and an instruction/data memory address. Further, error correcting codes, such as checksums and CRC's, may be computed from sequences and may therefore provide enhanced error detection capability in contrast to simply comparing result (or intermediate result) values.

Error Detection for Deterministic Program Execution

In one embodiment, various error correcting codes (ECCs) may be used to detect, and in some cases correct, errors. Exemplary ECCs include:

Parity
XOR all the bits of the data word together to form 1 bit of parity
Longitudinal Redundancy Check (LRC)
a byte-by-byte parity computation (or dataword-by-dataword chunks, 8, 16, or 32 bit, etc.)
XOR all the bytes of the data word together, creating a one-byte result
Checksums
SUM (+) all the bytes of the data word together, creating a one-byte result (or in 8, 16, or 32 bit chunks, etc.)
Ex: Two's complement (integer), One's complement, Fletcher Checksum, Adler Checksum, ATN Checksum (AN/466)
CRC—Cyclic Redundancy Codes
polynomial division using feedback XOR circuit
Ex: CRC-8, 9, 10, 11, 12, 16, 24, 32
Cryptographic hashes: MD5, SHA-0,1,2,3

Additionally, ECCs may be applied to deterministic programs. These deterministic programs may include programs that follow the same instruction sequence every time they execute, regardless of the data that they are computing on. For example, deterministic programs may have no data dependent branches, and the branches may only depend on the instructions.

Figure 4:
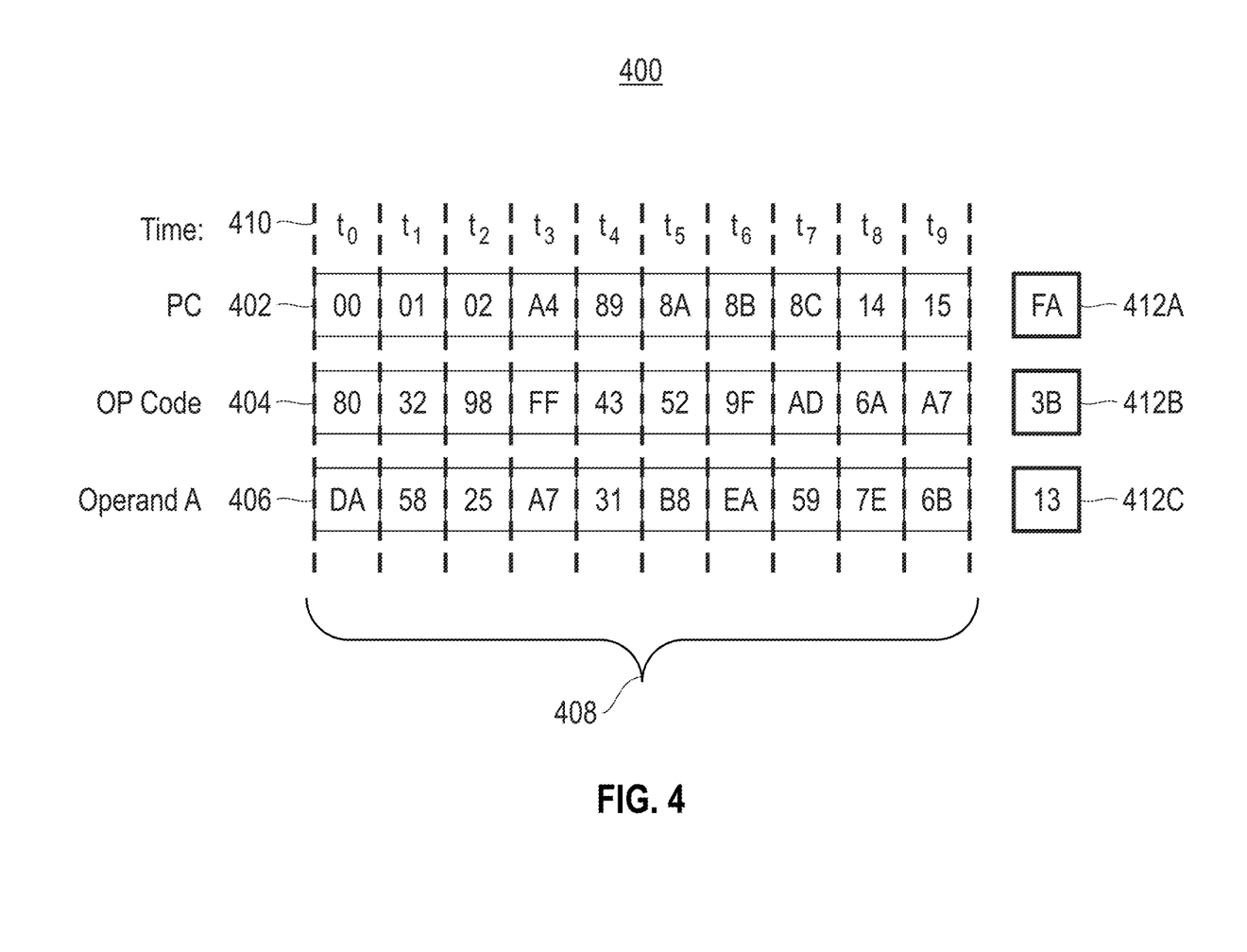
FIG. 4 illustrates an exemplary PC and instruction stream timing diagram, in accordance with one embodiment.

FIG. 4 illustrates an exemplary PC and instruction stream timing diagram 400, according to one exemplary embodiment. In one embodiment, an execution of a deterministic program generates, for a predetermined series of time values 410, a deterministic stream of program counter (PC) values 402 and instructions (e.g. OP codes 404, operands 406, etc). A predetermined sequence 408 within the deterministic stream has a length L, which may include a number of data words that the ECC is computed over.

Additionally, performing ECC calculations on the PC values 402, OP codes 404, and operands 406 results in respective check sequences 412A-C. In one embodiment, the size of the check sequences 412A-C may include the number of bits in the check sequence, and may not be equal to the data sequence size. In another embodiment, only a subset of the check sequences 412A-C may be created.

Figure 5:
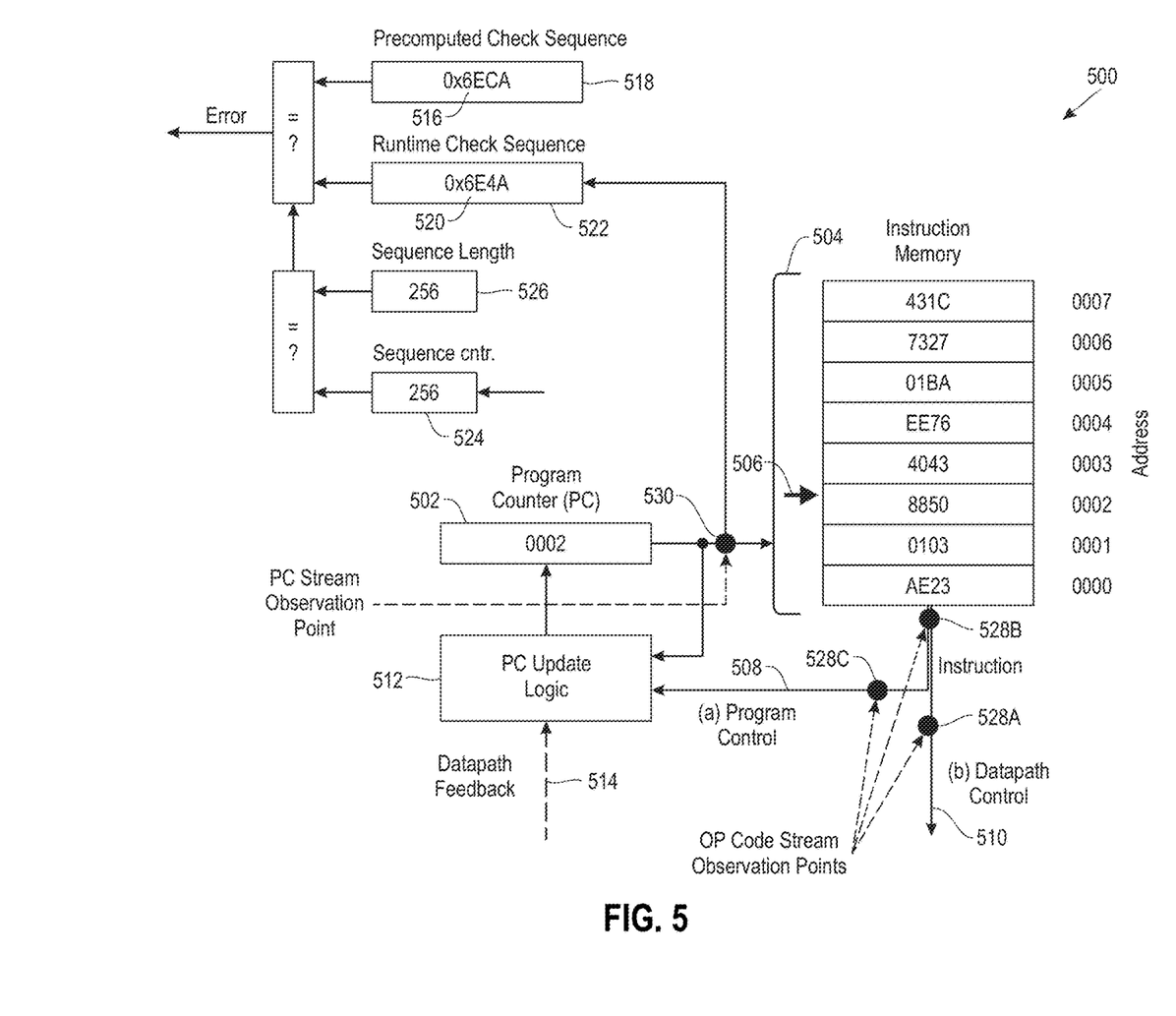
FIG. 5 illustrates an exemplary program execution error detection unit, in accordance with one embodiment.

FIG. 5 illustrates an exemplary program execution error detection unit 500, according to one exemplary embodiment. As shown in FIG. 5, a program counter (PC) 502 contains an address pointer to a location in instruction memory. In one embodiment, the PC 502 may include a new value for each cycle of operation. Additionally, instructions are read from an instruction memory 504 based on a program counter address pointer 506. Read instructions may include both program control information 508 and data path control information 510.

Additionally, a new PC value is computed by PC update logic 512, based on a current state of the PC 502, the program control information 508, and data path feedback 514. Further, a pre-computed ECC check sequence 516 may be determined for a fixed-length sequence of PC values of a deterministic program retrieved from a PC stream observation point 530, and may be loaded into a hardware register 518 prior to execution of the deterministic program.

Further still, in one embodiment, at runtime, a runtime ECC check sequence 520 may be computed for the same fixed-length sequence of PC values or instruction values of the deterministic program and may be stored in another hardware register 522.

Also, in one embodiment, a sequence counter 524 may be started at the start of a deterministic program, and may be incremented after every instruction cycle. The sequence counter 524 is compared to a predetermined sequence length 526, and when the value of the sequence counter 524 matches the value of the predetermined sequence length 526, a comparison is triggered.

In response to a comparison being triggered, the pre-computed ECC check sequence 516 stored in the hardware register 518 may be compared to the runtime ECC check sequence 520 stored in the other hardware register 522. If the pre-computed ECC check sequence 516 matches the runtime ECC check sequence 520, the program sequence may be executed without error. However, if the pre-computed ECC check sequence 516 does not match the runtime ECC check sequence 520, an error may be reported.

In this way, a pre-computed ECC check sequence 516 is used to validate the runtime ECC check sequence 520. This may be used for known data such as instruction, operation (OP code), and parameter streams. As a result, control plane integrity may be verified.

Also, additional error detection units may be implemented for various other data points 528A-C. For example, while the exemplary program execution error detection unit 500 retrieves a fixed-length sequence of PC values of the deterministic program from a PC stream observation point 530, additional error detection units may retrieve a fixed-length sequence of instruction op codes of the deterministic program from an instruction observation point 528B, a fixed-length sequence of program control op codes of the deterministic program from a program control observation point 528C, and/or a fixed-length sequence of data path control op codes of the deterministic program from a data path control observation point 528A.

Figure 6:
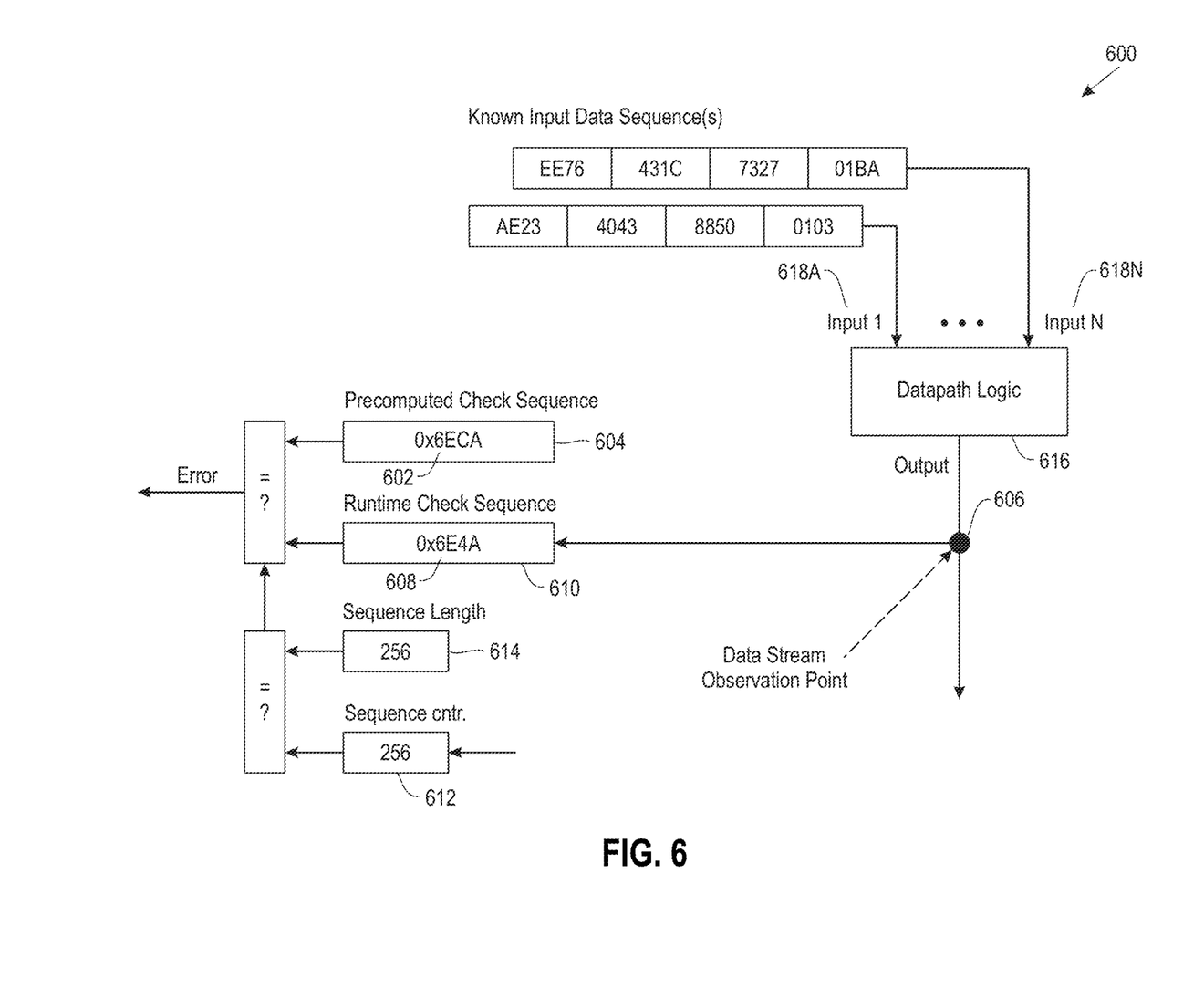
FIG. 6 illustrates an exemplary data plane verification unit, in accordance with one embodiment.

FIG. 6 illustrates an exemplary data plane verification unit 600, according to one exemplary embodiment. As shown in FIG. 6, an ECC check sequence 602 for a test data sequence may be pre-computed and loaded into a hardware register 604 prior to execution of a deterministic program.

Further still, in one embodiment, at runtime, the test data sequence is inserted into the data plane. This test data sequence may be identified at a data stream observation point 606 as output from a data path logic 616 with an arbitrary number of inputs 618A-N, and a runtime ECC check sequence 608 may be computed for the test data sequence and may be stored in another hardware register 610. Exemplary data path logic 616 includes an arithmetic logic unit (ALU), a matrix multiply with accumulator, etc.

Also, in one embodiment, a sequence counter 612 may be started at the start of a deterministic program, and may be incremented after every instruction cycle. The sequence counter 612 is compared to a predetermined sequence length 614, and when the value of the sequence counter 612 matches the value of the predetermined sequence length 614, a comparison is triggered.

In response to a comparison being triggered, the pre-computed ECC check sequence 602 stored in the hardware register 604 may be compared to the runtime ECC check sequence 608 stored in the other hardware register 610. If the pre-computed ECC check sequence 602 matches the runtime ECC check sequence 608, the program sequence may be executed without error. However, if the pre-computed ECC check sequence 602 does not match the runtime ECC check sequence 608, an error may be reported.

In this way, by periodically inserting known test data sequences into the data plane, with pre-computed ECC check sequences, the data plane integrity can also be verified. This ECC check sequence approach to data plane integrity verification is stronger (more robust) than simply checking the final result of the computation to a precomputed final result, since errors introduced by a faulty program or circuit may not alter the final computed result.

In one embodiment, the ECC check sequence may be computed across multiple spatial points in the design in parallel. This may work with both control plane and data plane approaches. This may increase a data word size, and may require a number of check sequences to be stored, and a number of parallel ECC checking units.

Additionally, in one embodiment, long deterministic programs may be broken into multiple program execution sequences, with an ECC check sequence per execution sequence. Programs that are not fully deterministic, but exhibit deterministic sequences within a non-deterministic program are partially deterministic. The deterministic sequence within a partially deterministic program can be verified using the above approach. This may provide some verification of the control plane integrity, such as the program control and execution units.

Further, in one embodiment, a neural network has at least one precomputed check sequence associated with it. These check sequence(s) may be based on network parameter streams (e.g., weights, biases, scaling factors, etc.). These check sequence(s) may be the signature of the specific neural network. In another embodiment, running the inference operation using the neural network generates at least one runtime check sequence. Therefore, a precomputed check sequence may be compared to a runtime check sequence for the neural network. If the precomputed and runtime check sequences match, then it may be determined, with high probability, that the specified neural network has been used for inference. If the precomputed and runtime check sequences do not match, then it may be determined that the specified neural network is not functioning properly.

Figure 7:
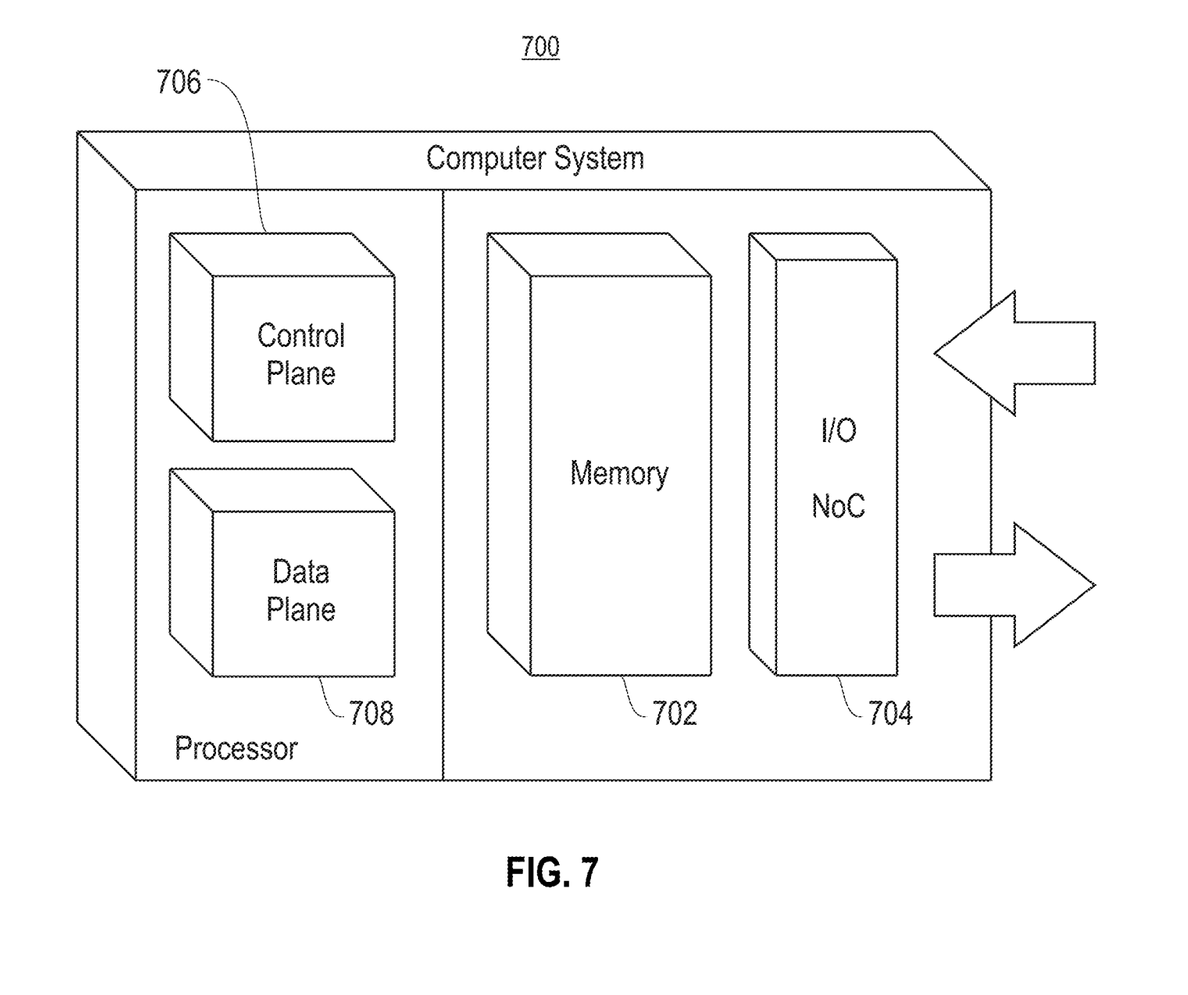
FIG. 7 illustrates an exemplary system in which error detection may be performed, in accordance with one embodiment.

FIG. 7 illustrates an exemplary system 700 in which error detection may be performed, according to one exemplary embodiment. As shown, the system 700 includes memory 702 and I/O 704. Additionally, the system 700 includes a control plane 706 and a data plane 708. In one embodiment, program execution ECCs may be implemented during deterministic runtime execution in order to identify errors within the control plane 706. In another embodiment, test vector ECCs may be implemented during runtime execution in order to identify errors within the data plane 708.

In one embodiment, the control plane 706 may include one or more of instruction fetches, decodes, and issues, address and PC calculations, and control and instruction buses. In another embodiment, the data plane 708 may include one or more of registers, arithmetic/logic units (integer and floating point), and data buses.

Additionally, in one embodiment, error detection may be performed for the data plane and control plane of a neural inference processor unit, utilizing the above techniques.

In one embodiment, a method and a system for error detection in deterministic program execution using Error Correction Codes (ECC) includes pre-computing an ECC check sequence for a stream of PC/OP code values in a deterministic program. Additionally, the ECC check sequence is loaded into a hardware register prior to the deterministic program execution. Further, at runtime, the ECC check sequence is computed for a fixed-length, deterministic program execution sequence.

For example, a sequence counter begins at deterministic program start, and is incremented every instruction cycle. When the sequence counter reaches a preset sequence length, the computed runtime ECC check sequence is compared with the stored pre-computed ECC check sequence. If the check sequences match, the program sequence has executed without error. If the check sequences do not match, there was a mismatch in the execution sequence.

The above technique may be used for both control plane and data plane verification. Additionally, ECC check sequences may be computed across multiple spatial points in a design in parallel.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   prior to an execution of a deterministic program, determining a pre-computed check sequence for a first plurality of values associated with the execution of the deterministic program;
   during the execution of the deterministic program, determining a runtime check sequence for a second plurality of values associated with the execution of the deterministic program;
   comparing the pre-computed check sequence to the runtime check sequence; and
   identifying one or more errors associated with the execution of the deterministic program, based on the comparing.

2. The computer-implemented method of claim 1, wherein the first plurality of values includes a fixed-length, deterministic program execution sequence within the deterministic program.

3. The computer-implemented method of claim 1, wherein the first plurality of values includes a predetermined desired output of an execution of a predetermined portion of the deterministic program by a processor.

4. The computer-implemented method of claim 1, wherein the first plurality of values includes a plurality of program counter (PC) values desired to be generated by a processor for a predetermined portion of the deterministic program.

5. The computer-implemented method of claim 1, wherein the first plurality of values includes a plurality of instructions desired to be generated by a processor during the execution of the plurality of instructions within a predetermined portion of the deterministic program.

6. The computer-implemented method of claim 1, wherein the first plurality of values includes a plurality of neural network parameters selected from a group consisting of weights, biases, thresholds, and activation functions.

7. The computer-implemented method of claim 1, wherein the first plurality of values includes a predetermined test vector.

8. The computer-implemented method of claim 1, wherein the first plurality of values comprises neuron activations and is generated by at least a portion of a neural network execution.

9. The computer-implemented method of claim 1, wherein determining the pre-computed check sequence includes applying an error correcting code (ECC) to the first plurality of values.

10. The computer-implemented method of claim 1, further comprising storing the pre-computed check sequence in a hardware register.

11. The computer-implemented method of claim 1, wherein the deterministic program is executed by a hardware processor, the hardware processor comprising a neural network processing unit.

12. The computer-implemented method of claim 1, wherein the second plurality of values is associated with a same predetermined portion of the deterministic program associated with the first plurality of values.

13. The computer-implemented method of claim 12, wherein the second plurality of values includes runtime values output by a processor during a processing of the predetermined portion of the deterministic program.

14. The computer-implemented method of claim 1, wherein the second plurality of values includes a test data sequence computed by a processor, from one or more data sequences inserted into the processor, during the execution of a predetermined portion of the deterministic program for which the first plurality of values were provided.

15. The computer-implemented method of claim 1, wherein the second plurality of values are obtained from a control plane of a processor or a data plane of the processor.

16. The computer-implemented method of claim 1, wherein determining the runtime check sequence includes applying an error correcting code (ECC) to the second plurality of values.

17. The computer-implemented method of claim 1, wherein the comparing is performed in response to a sequence counter matching a predetermined sequence length.

18. The computer-implemented method of claim 1, wherein the one or more errors are identified in response to determining that the pre-computed check sequence does not match the runtime check sequence.

19. A processor including compare circuitry for performing error detection during deterministic program execution, the compare circuitry performing a method comprising:
   prior to an execution of a deterministic program, determining, by the compare circuitry, a pre-computed check sequence for a first plurality of values associated with the execution of the deterministic program;
   during the execution of the deterministic program, determining, by the compare circuitry, a runtime check sequence for a second plurality of values associated with the execution of the deterministic program;
   comparing, by the compare circuitry, the pre-computed check sequence to the runtime check sequence; and
   identifying, by the compare circuitry, one or more errors associated with the execution of the deterministic program, based on the comparing.

20. A system, comprising:
a processor including compare circuitry for:
prior to an execution of a deterministic program, determining a pre-computed check sequence for a first plurality of values associated with the execution of the deterministic program;
during the execution of the deterministic program, determining a runtime check sequence for a second plurality of values associated with the execution of the deterministic program;
comparing the pre-computed check sequence to the runtime check sequence; and
identifying one or more errors associated with the execution of the deterministic program, based on the comparing.

\* \* \* \* \*